A. P. SILVA,

Assignor to J. Paret.

COAT.

No. 7,759. Reissued June 19, 1877.

WITNESSES

Wm A. Skinkle

Geo. W. Beckt.

INVENTOR

Albert P. Silva.

By his Attorneys,

Baldwin, Hopkins & Peyton.

UNITED STATES PATENT OFFICE.

ALBERT P. SILVA, OF ELMIRA, NEW YORK, ASSIGNOR TO JOHN PARET, OF NEW YORK CITY.

IMPROVEMENT IN COATS.

Specification forming part of Letters Patent No. 184,802, dated November 28, 1876; reissue No. 7,759, dated June 19, 1877; application filed June 9, 1877

*To all whom it may concern:*

Be it known that I, ALBERT P. SILVA, of Elmira, in the county of Chemung and State of New York, have invented certain new and useful Improvements in Coats, of which the following is a specification:

My invention more especially relates to overcoats, but may be applied to other coats or to jackets. My object is to render such coats more comfortable than heretofore by affording additional protection from the weather.

My improvements consist in the attachment or use of a supplementary or additional collar inside of the neck or ordinary collar of a coat in such manner that the supplementary collar may be used to protect the neck or neck and face of the wearer. They also consist in the employment, in connection with the ordinary collar, of a supplementary collar attached to the coat in such manner that it may, when not in use, be folded out of the way, and concealed and held in place upon the inside of the coat, without destroying the set of the garment. They also consist in a coat constructed with inside openings or receptacles for the ends of the supplementary collar when folded. They also consist in the attachment to the sleeve of the coat of a mitten or hand-covering, connected with or forming an extension of the sleeve. They also consist of the employment, in connection with the coat-sleeves, of folding mittens forming extensions of or connected to the sleeves, and which, when not in use, may be folded up out of the way; and, finally, my improvements consist of a coat provided with a supplementary collar for affording additional protection to the neck, and with mittens secured to and forming extensions of the sleeves.

Figure 1:
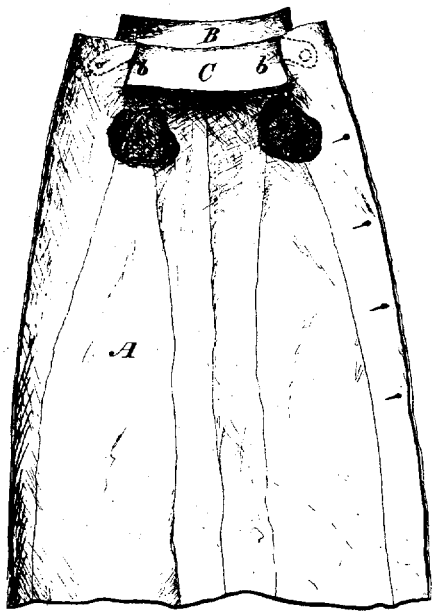
Figure 2:
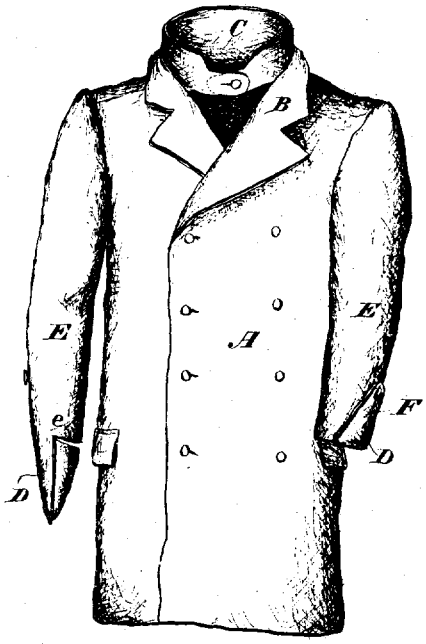
Figure 3:
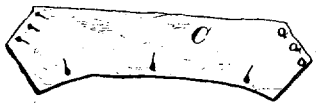
Figure 4:
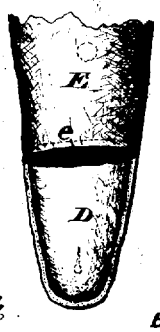
Figure 5:
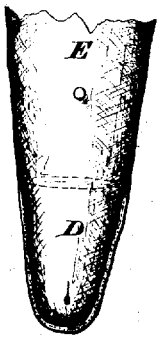
Figure 6:
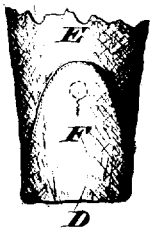

Figure 1 is an inside view of the coat opened and having all my improvements applied; Fig. 2, a front view of the coat closed, with the supplementary collar adjusted for use as upon the wearer, with one of the hand-coverings opened or extended for use and the other folded. Fig. 3 is a view of a detachable supplementary collar. Fig. 4 is a view of the inner side, or that side next the wearer, of one of the sleeves with its mitten or hand-covering opened or extended out; Fig. 5, a similar view of the outer side of the same; and Fig. 6, a view of the outer side of a sleeve with the hand-covering folded.

A coat, A, is provided with the usual collar B and a supplementary or inside collar, C, which is made to conform to the neck and face, or a portion of the face, when in use, and may be lined with fur or other suitable lining. The supplementary collar is attached to the inside and under the collar B. When not in use the additional collar may be folded in the inside of the garment. Inside slits or openings *b b* in the coat serve to receive and secure this collar in place by inserting its ends therein when folded out of the way. If required, the collar C may be made detachable, as shown by Fig. 3 of the drawings, and, when desired for use, be secured to the coat with buttons or other suitable appliances instead of being permanently attached.

A hand covering or mitten, D, (one for each sleeve,) is connected to or forms an extension of the sleeve E of the coat. The end of the sleeve is shown in this instance as made in the form of the common mitten, without the thumb, and has an opening, *e*, for the admission of the hand. When not in use the mittens may be folded from the openings *e* on the wrist of the sleeve, and thus, when folded outside, forming cuffs F.

If, while wearing the garment without the use of the above-described appendages, their use should be required, the collar B is slightly thrown back and the collar C drawn up and secured around the neck and face, as shown in Fig. 2. The cuffs formed by the mittens are then detached at the ends from the sleeves and unfolded or turned down, when the hands are entered through the openings *e* into the mittens, which efficiently protect the hands and wrists from the cold.

I thus by my invention provide neat, simple, and convenient protections from the inclemency of the weather, as substitutes for the ordinary cumbersome appendages used for that purpose. The collar, it will be seen, may be snugly folded on the inside of the coat, and thus worn without destroying the set of the garment, (its ends being inserted in the openings *b* when they are provided,) and, when required, readily unfolded and secured around the neck and face, and when the mittens are not in use they may form ornamental cuffs to the sleeves.

I claim as of my own invention—

1. A coat having a supplementary collar inside of the neck or ordinary collar, substantially as and for the purpose set forth.

2. The inside openings for the reception of the supplementary-collar ends, substantially as set forth.

3. A coat constructed, substantially as hereinbefore set forth, with inside openings, the ordinary collar, and a supplementary or inner folding collar, the ends of which, when not in use, are secured in said openings.

4. A coat sleeve constructed, as hereinbefore set forth, with a mitten connected with or forming an extension thereof.

5. A coat constructed, substantially as hereinbefore set forth, with sleeves provided with folding mittens, connected with or forming parts of said sleeves.

6. A coat constructed, as hereinbefore set forth, with a supplementary collar upon the inside of the ordinary collar, and mittens connected to or forming extensions of the sleeves.

ALBERT P. SILVA.

Witnesses:

JOHN F. PARET,
BALTIS DE LONG.